United States Patent
Wilson

(10) Patent No.: US 7,212,345 B2
(45) Date of Patent: May 1, 2007

(54) RANDOMIZED PATTERNS OF INDIVIDUAL OPTICAL ELEMENTS

(75) Inventor: Randall H. Wilson, Albuquerque, NM (US)

(73) Assignee: Eastman Kodak Company, Rochester, NY (US)

( * ) Notice: Subject to any disclaimer, the term of this patent is extended or adjusted under 35 U.S.C. 154(b) by 429 days.

(21) Appl. No.: 10/939,769

(22) Filed: Sep. 13, 2004

(65) Prior Publication Data

US 2006/0055627 A1   Mar. 16, 2006

(51) Int. Cl.
*G02B 27/10* (2006.01)

(52) U.S. Cl. .................. 359/619; 359/622; 359/623

(58) Field of Classification Search ................ 359/619, 359/620, 621, 622, 623, 624
See application file for complete search history.

(56) References Cited

U.S. PATENT DOCUMENTS

| | | | |
|---|---|---|---|
| 5,919,551 A | 7/1999 | Cobb, Jr. et al. ........... | 362/618 |
| 6,322,236 B1 | 11/2001 | Campbell et al. ........... | 362/333 |
| 6,354,709 B1 | 3/2002 | Campbell et al. ............. | 362/19 |
| 2003/0214728 A1 | 11/2003 | Olczak ....................... | 359/707 |
| 2004/0114346 A1 | 6/2004 | Parker et al. ................. | 362/31 |
| 2005/0122591 A1 | 6/2005 | Parker et al. ............... | 359/619 |

OTHER PUBLICATIONS

U.S. Appl. No. 10/868,083, Brickey et al., filed Jun. 15, 2004.
U.S. Appl. No. 10/868,689, Bourdelais et al., filed Jun. 15, 2004.

*Primary Examiner*—Timothy Thompson
(74) *Attorney, Agent, or Firm*—Paul A. Leipold

(57) ABSTRACT

A method of randomizing elements into a random pattern on a surface so the random pattern of elements substantially entirely consumes a region of the surface includes choosing an overlap distance and creating an initial pattern of elements that substantially entirely consumes a region of the surface, wherein neighboring elements overlap by the overlap distance. The method also includes choosing a maximum displacement distance, and displacing the elements by random displacement distances from their positions in the initial pattern, the random displacement distances being less than the maximum displacement distance. Moreover, a signed difference in displacement between two neighboring elements is not greater than the overlap distance. An apparatus including the elements is also disclosed.

50 Claims, 18 Drawing Sheets

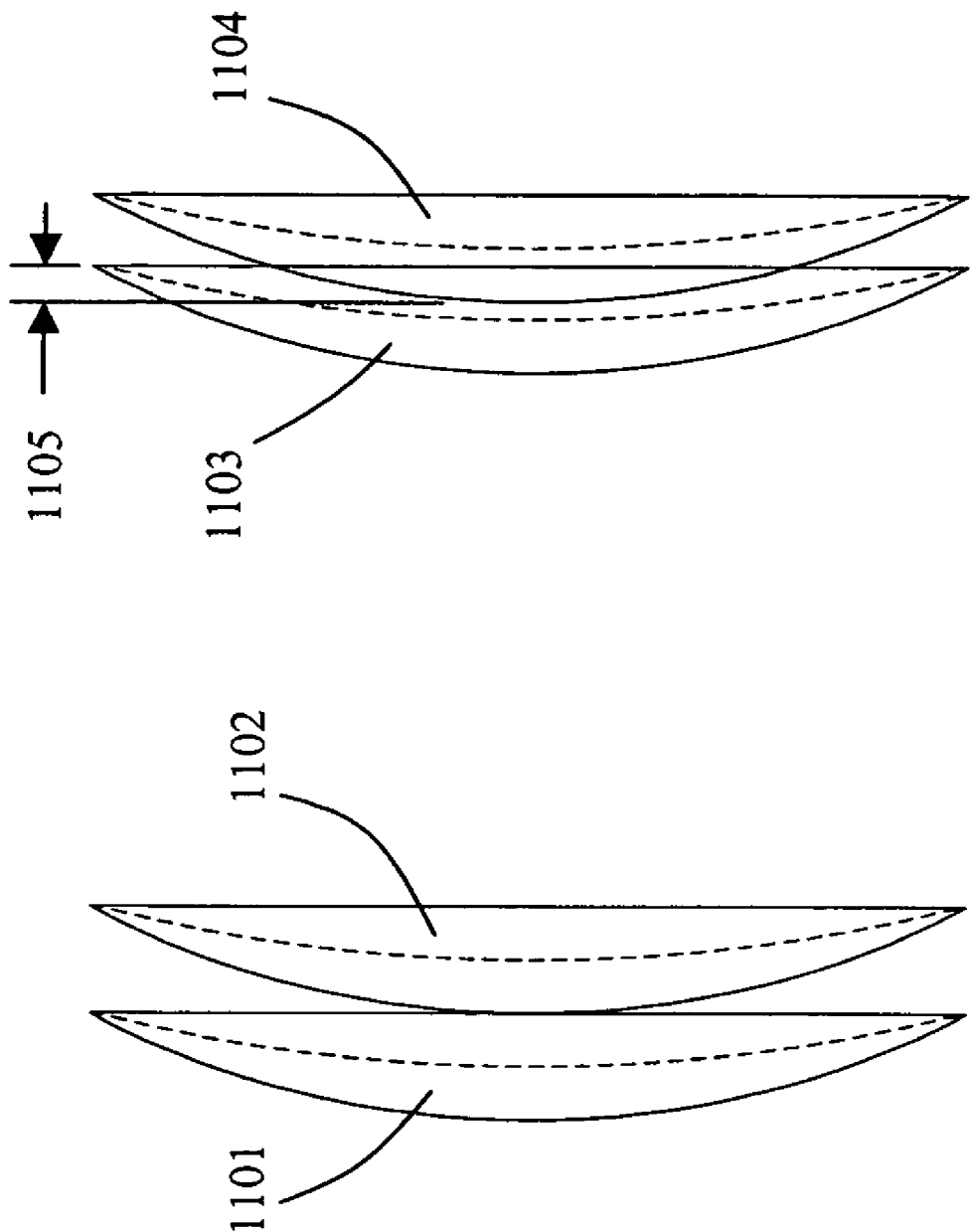

RANDOMIZED PATTERNS OF INDIVIDUAL OPTICAL ELEMENTS

FIELD OF THE INVENTION

Embodiments of the present invention relate to light redirecting films for redirecting light from a light source toward a direction normal to the plane of the film.

BACKGROUND OF THE INVENTION

Light redirecting films may be used in a variety of applications. Illustratively, light directing films may be used as part of a display or lighting device. Display and lighting devices may be based on a variety of technologies and can have very disparate applications. Regardless of the technology base or application, light directing films may be used to improve the efficiency of the light transmitted from a light source to an output.

One technology that has gained attention in display technologies is liquid crystal (LC) technology. An LC display (LCD) includes a liquid crystal material that is modulated to provide a light-valve function. In many LCD applications, it is useful to improve the power efficiency. Increasing the power efficiency of an LCD (or other similar display) may be useful in improving the image quality of the display, among other benefits.

One way to improve the efficiency of LCDs is by recycling light using light redirecting film(s). The optics of a light redirecting film may be very specific and detailed. A light redirecting film may include a plurality of optical elements. These optical elements may be shaped and arranged to redirect light in an LCD, making the LCD more energy efficient. However, there may be secondary effects of a light redirecting film (e.g., moiré effects or a moiré interference pattern) that reduce the quality of the display. For example, light redirecting films that exhibit moiré effects may have undesirable non-uniform brightness across the LCD screen. This non-uniform brightness may be due to an ordered arrangement of optical elements in the light redirecting film.

What is needed therefore, is an apparatus, or method, or both that addresses at least the deficiencies described above.

SUMMARY OF THE INVENTION

In accordance with an example embodiment, a method of randomizing elements into a random pattern on a surface so the random pattern of elements substantially entirely consumes a region of the surface includes choosing an overlap distance and creating an initial pattern of elements that substantially entirely consumes a region of the surface, wherein neighboring elements overlap by the overlap distance. The method also includes choosing a maximum displacement distance, and displacing the elements by random displacement distances from their positions in the initial pattern, the random displacement distances being less than the maximum displacement distance. Moreover, a signed difference in displacement between two neighboring elements is not greater than the overlap distance.

In accordance with another example embodiment, an apparatus includes a plurality of elements disposed in a substantially random pattern over a surface. Illustratively, the elements cover substantially all of a region of the surface and are disposed at random displacement distances from their positions in a reference pattern of elements in which neighboring elements overlap by an overlap distance. The displacement distances are less than a maximum displacement distance, and a signed difference in displacement between two of the neighboring elements is not greater than the overlap distance.

BRIEF DESCRIPTION OF THE DRAWINGS

The invention is best understood from the following detailed description when read with the accompanying drawing figures. It is emphasized that the various features are not necessarily drawn to scale. In fact, the dimensions may be arbitrarily increased or decreased for clarity of discussion.

FIG. 11a shows two optical elements of a light redirecting film that are touching horizontally in accordance with an example embodiment.

FIG. 11b shows two optical elements of a light redirecting film that are overlapped in accordance with an example embodiment.

DEFINED TERMINOLOGY

Figure 1:
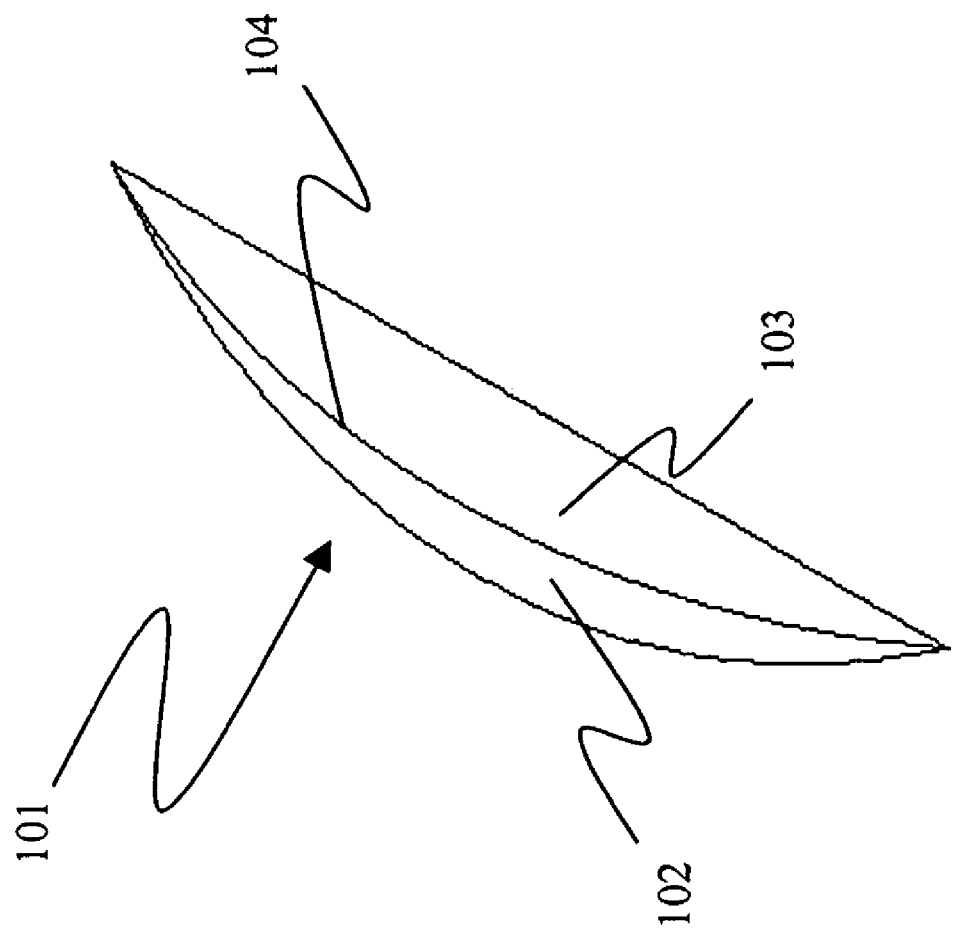
FIGS. 1 and 2 are schematic drawings of single individual optical elements in accordance with example embodiments.

As used herein, the terms "optical gain", "on axis gain", or "gain" mean the ratio of output light intensity in a desired direction, usually perpendicular to the film plane, divided by the input light intensity in the same direction. Gain is used as a measure of efficiency of a light redirecting film and can be used to compare the performance of light redirecting films.

As used herein, the term "individual optical elements", in the context of an optical film, means elements of a defined shape that can be projections or depressions in the optical film. Individual optical elements are small relative to the length and width of an optical film. As used herein, the term "curved surface" indicates a three dimensional surface on a film that is not planar. As used herein, the term "wedge shaped element" indicates an element that includes one or more sloping surfaces, and these surfaces may be a combination of planar and curved surfaces. One example of a wedge shaped element is an orange slice-like section and another is found in FIG. 1.

DETAILED DESCRIPTION OF THE INVENTION

In the following detailed description, for purposes of explanation and not limitation, example embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known apparati and methods may be omitted so as to not obscure the description of the present invention. Such methods and apparati and methods are clearly within the contemplation of the inventors in carrying out the example embodiments. Wherever possible, like numerals refer to like features throughout.

Light redirecting films of the example embodiments may be thin transparent optical films or substrates that redistribute the light passing through the films such that the distribution of the light exiting the films is directed more normal to the surface of the films. These light redirecting films may be provided with ordered prismatic grooves, lenticular grooves, or pyramids on the light exit surface of the films which change the angle of the film/air interface for light rays exiting the films and cause the components of the incident light distribution traveling in a plane perpendicular to the refracting surfaces of the grooves to be redistributed in a direction more normal to the surface of the films. Such light redirecting films are used, for example, to improve brightness in liquid crystal displays (LCD), laptop computers, word processors, avionic displays, cell phones, PDAs and the like to make the displays look brighter.

Example embodiments described herein relate to light redirecting films that include individual optical elements that significantly reduce deleterious optical effects such as moiré effects when used in lighting systems and displays, while maintaining relatively high on-axis gain. It is noted that for the purpose of clarity of description, the light redirecting films of the example embodiments are often described in connection with LC systems. However, it is emphasized that this is merely an illustrative implementation of the light redirecting films of the example embodiments. In fact, the light redirecting films of the example embodiments may be used in other applications such as light valve-based displays and lighting applications, to mention only a few. As will be apparent to one of ordinary skill in the art having had the benefit of the present description, the light redirecting films may be implemented in other varied technologies.

Visually, the moiré effect refers to a geometrical interference between two similar spatial patterns. The interference is most apparent between patterns that contain the same or nearly the same periodicities. The patterns observed when viewing cascaded transmission screens, such as picket fences, are examples of moiré. Upon analysis of these patterns it is clear that the moiré pattern is a result of the sum and differences of the screens' periodic components. The phenomenon is often referred to as beats or the beating of two patterns. The resulting observable moiré pattern has a lower frequency than either of the two original patterns, has an amplitude that is dependent on the strength of the harmonic components that are beating and an orientation that depends on the relative orientation of the two patterns. For example the moiré pattern produced by two square wave transmission gratings of equal period, p, vertically aligned and oriented at angle, θ, with respect to each other will be horizontally oriented with a period approximately equal to p/θ and have a line shape that is given by the convolution of the individual grating line shape. As the angle goes to zero the period gets infinitely wide. However, for perfectly aligned screens moiré is observable when they have nearly identical periods. The resulting moiré pattern will have a period equal to $p1*p2/(p1-p2)$, where p1 and p2 are the two screen periods. For example if grating 1 has a period p1=0.05 mm and grating 2 has a period p2=0.0501 mm, the resulting moiré period will be 25 mm.

Gratings with apparently significantly different periods can produce moiré effects if they have harmonics that are close in frequency. A square wave screen having period p1 will have harmonics that are multiples, n, of 1/p1, that is n/p1. The beating of these harmonics with the fundamental of a second screen of period, p2, will produce beats having period equal to $p1*p2/(n*p2-p1)$. Consider the fifth harmonic (n=5) of a screen having period p1=0.25 mm and a screen with period p2=0.0501. The resulting moiré period is 25 mm.

Whether or not the resulting moiré pattern will actually be observed depends on the resulting period and modulation. The combined visual impact of these parameters is contained in the Van Nes Bouman curve of contrast modulation threshold. This curve indicates the minimum contrast required for observeability as a function of spatial frequency given in cycles/degree. Generally the eye is most sensitive to frequencies between 2 and 10 cycles/degree, peaking at 5 cycles/deg. In this range the visual threshold is ~0.1% modulation. To convert the spatial period into spatial frequency in cycles/degree requires introducing the observers viewing distance. At a viewing distance of 18 inches, one degree subtends ~8 mm. Thus dividing 8 mm by the spatial period of the moiré pattern in mm yields its spatial frequency in cycles/degree. For the above examples, the moiré period of 25 mm corresponds to ~0.32 cycles/degree. At this spatial frequency the visual threshold is ~1% modulation. From Fourier analysis, pure square wave screens will have ~1.8% modulation, making them slightly visible.

As can be appreciated, certain parameters that impact the visibility of the moiré pattern are the spatial frequency in cycles/degree and its modulation. Since these properties are derived from the underlying screens their construction parameters are key. As discussed herein, straight line screens or screens that vary in only one direction will produce straight-line moiré patterns. The introduction of a curved structure or offset into the pattern makes the pattern two-dimensional.

Periodic placements will result in two-dimensional harmonic components. It will be the beating of these periodic components with the periodicities of a thin film transistor (TFT) black matrix structure that can produce moiré patterns. This two-dimensional pattern can be viewed as overlapping diamonds or sinusoids. As the long dimension lengthens the pattern becomes one-dimensional and a moiré pattern can develop as described above. This is similar to the moiré patterns developed between the TFT and a linear screen except that the curved structure of the element results in wider line shape due to the convolution operation and as a result contrast can be lower. Also randomization that is introduced helps break the periodicity further reducing the observation of moiré. Light directing films that are less susceptible to moiré patterns are described in connection with example embodiments, and example embodiments drawn to producing such films are described as well.

FIG. 1 is a schematic drawing of a single curved individual optical element 101, with one curved surface 102 and one planar surface 103. The curved edge where the two surfaces meet is the ridge 104. In example embodiments, the individual optical elements have one curved surface and one planar surface. The curved surface 102 can have curvature in one, two, or three axes and serves to redirect the light in more than one direction. For example, the film can contain elements that curve side to side and up and down. It is noted that example embodiments have elements with curvature in the plane of the film such that the elements can redirect light in more than one direction.

Figure 2:
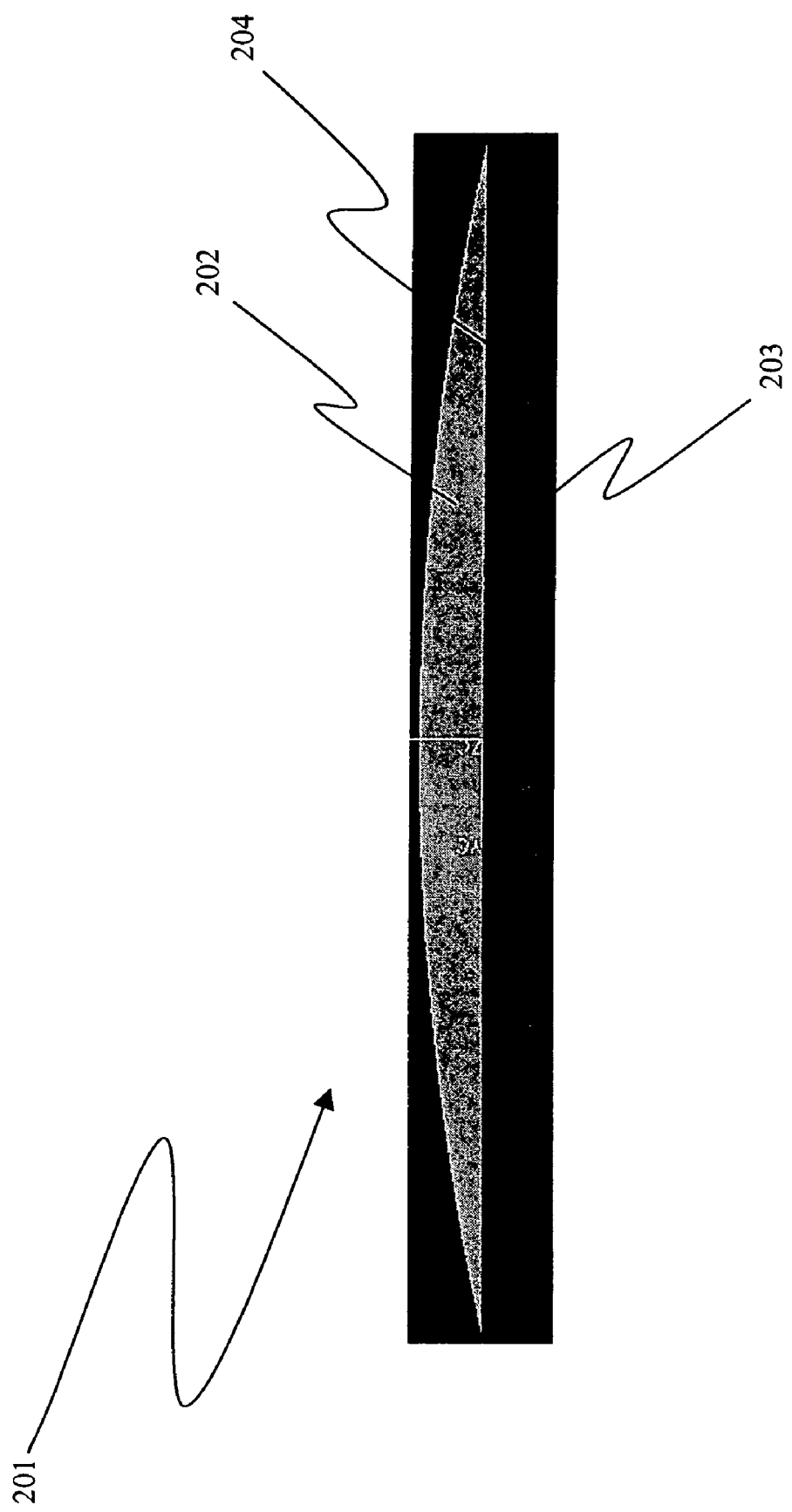

In example embodiments, the individual optical elements have two curved surfaces. The curved surfaces can have curvature in one, two, or three axes and serve to redirect the light in more than one direction. For example FIG. 2 is a schematic drawing of a single individual optical element 201, with curved surfaces 202 and 203. The curved edge where the two surfaces meet is again the ridge 204. It is noted that example embodiments have two symmetric curved surfaces such that the light output is symmetric as well.

Figure 3:
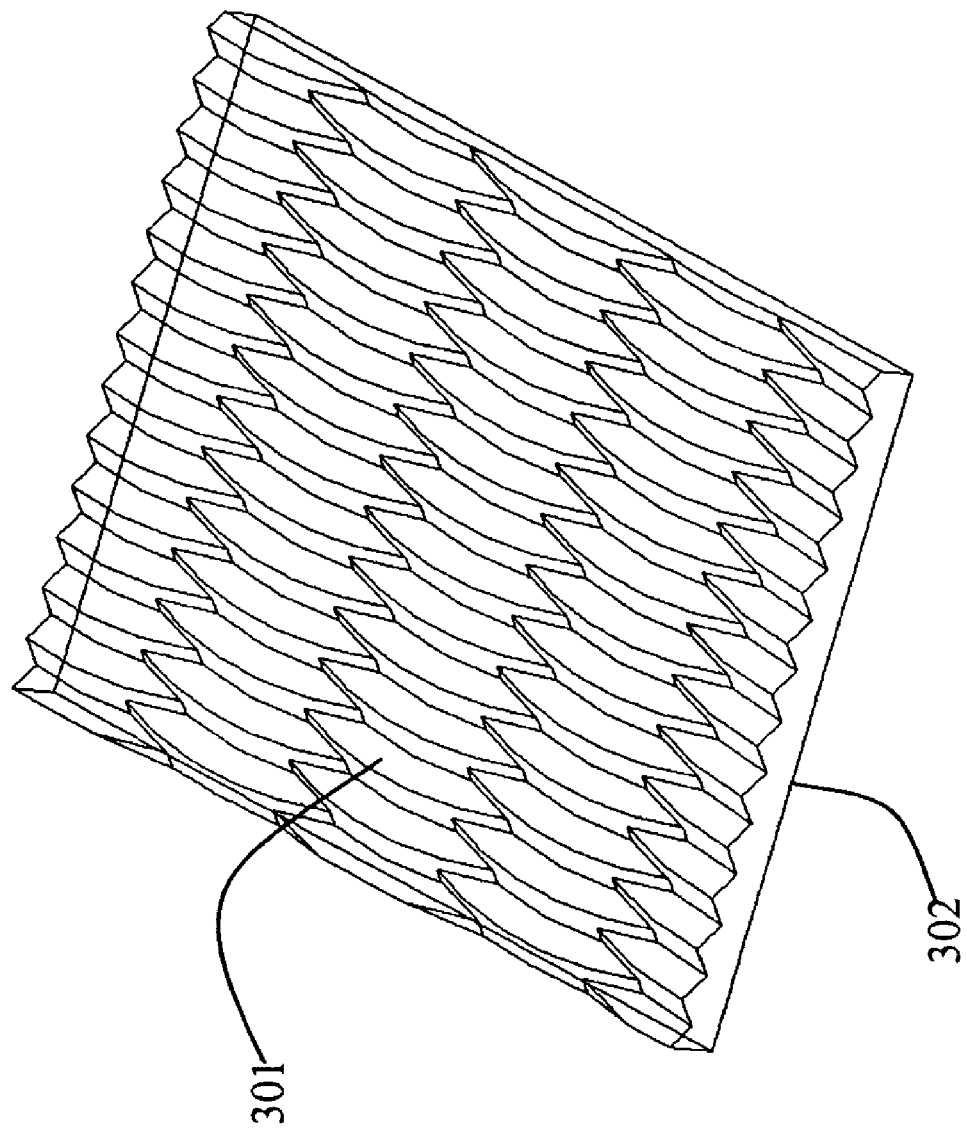
FIG. 3 illustrates a light redirecting film in accordance with an example embodiment.

FIG. 3 is a schematic drawing of an example light redirecting film having a front surface 301 that is substantially covered by an ordered array of individual optical elements 101. Light from a backlight or other light source enters the film at the back surface 302 and exits the front patterned surface 301. The distance between the same point on neighboring elements (for example, the point at the center of the ridge) in each direction is called the pitch of the pattern in that direction. When the positions of the optical elements are randomized, then an average pitch can be calculated in each direction. Any area of the film front surface that is not covered by an optical element is called "unpatterned area."

Figure 4:
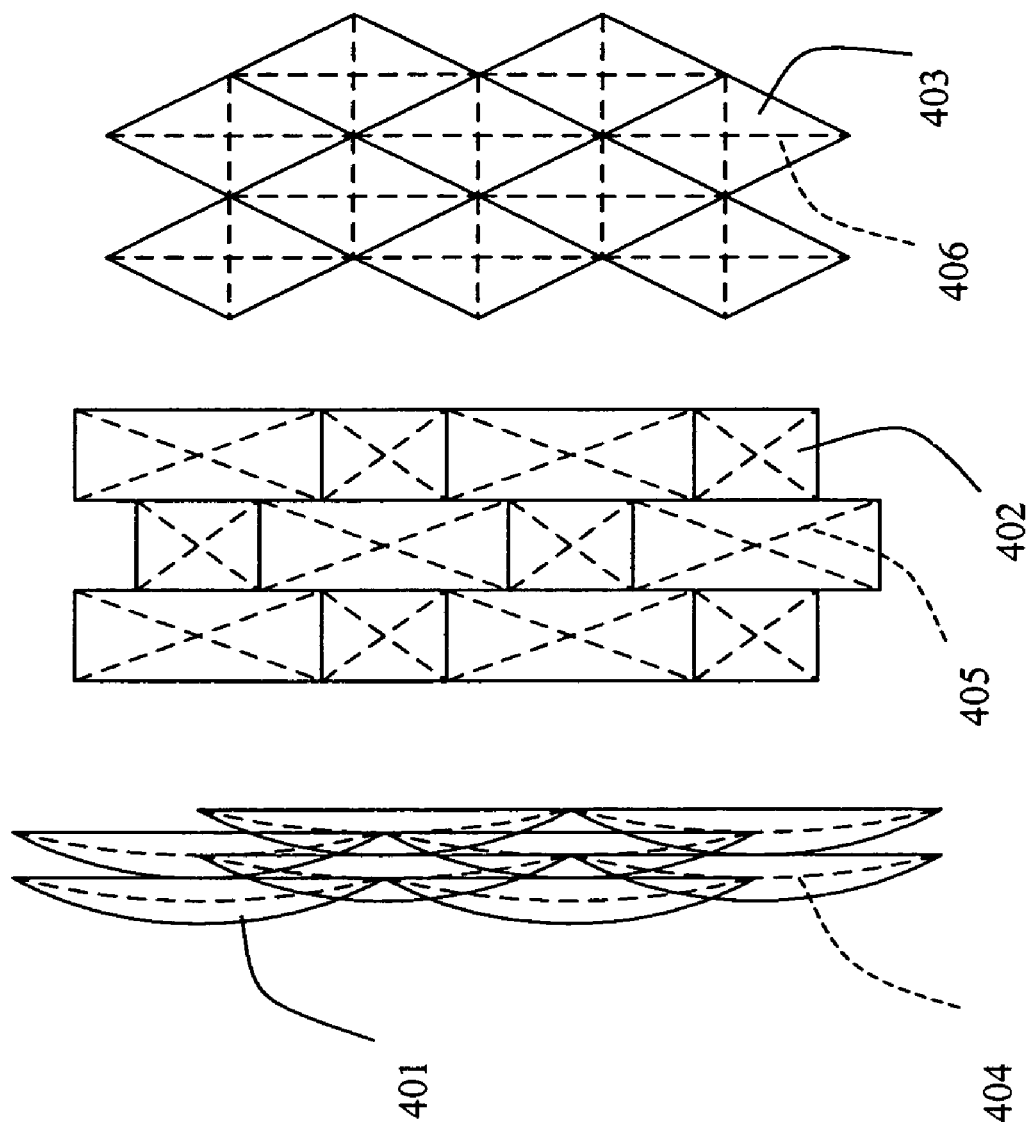
FIG. 4 illustrates individual optical elements arranged in ordered patterns in accordance with an example embodiment.

FIG. 4 is a top view of other individual optical elements 401, 402, 403 arranged into ordered patterns according to other illustrative embodiments of the invention. The ridges 404, 405, 406 of each type of optical element are shown as dashed lines. In some embodiments, the elements of the pattern may have multiple sizes and shapes, yet still combine to completely cover the surface of the optical film. As such the light redirecting films of the example embodiments may have individual optical elements of many different shapes. Some of these shapes are described in U.S. Pat. No. 6,752,505 by Parker, et al. The disclosure of this patent is hereby incorporated herein by reference.

Figure 5:
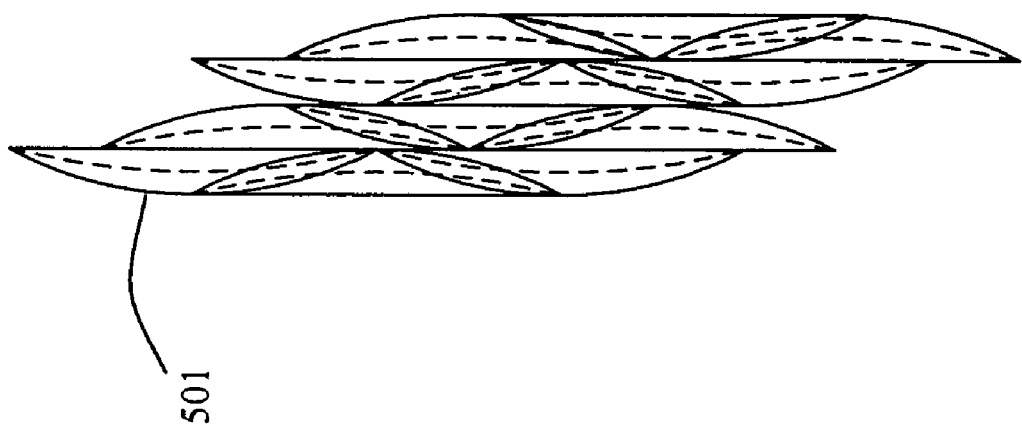
FIG. 5 illustrates orientation of curved optical elements in accordance with example embodiments.

The individual optical elements may be placed in many configurations on the film and can actually be customized to the light output from the light guide plate. In one embodiment, about half of the individual optical elements are rotated by approximately 180 degrees relative to each other. This provides light redirection substantially equally in directions perpendicular to the ridges of the elements, when the surfaces of the elements on either side of the ridge are not symmetric. An example embodiment showing this orientation of the curved elements 501 is shown in FIG. 5.

Figure 6:
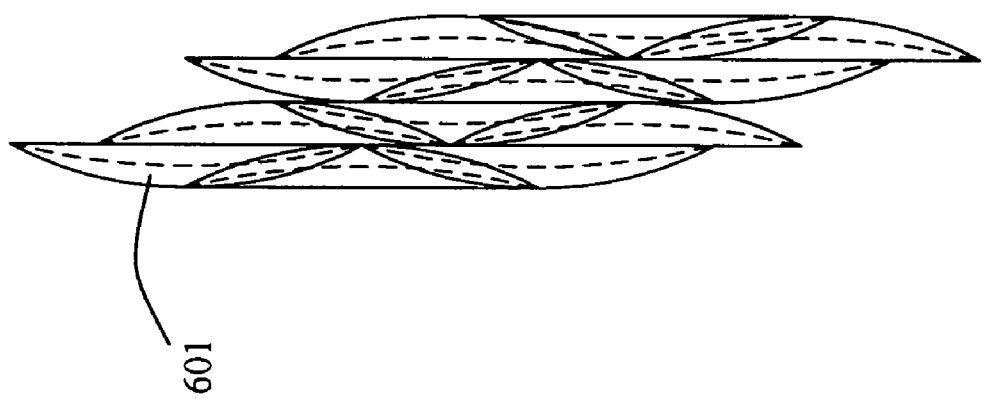
FIG. 6 illustrates staggering of curved optical elements in accordance with example embodiments.

In example embodiments, the individual optical elements are staggered with respect to one another. This staggering helps hide horizontal patterns in the light redirecting film and therefore, to reduce moiré effects in a system. The optical elements 601 may be staggered and arranged such that there is no unpatterned area on the light redirecting film, as shown in FIG. 6.

In certain example embodiments, the individual optical elements are oriented opposite each other in a mirror-image configuration. In this mirror-image configuration, pairs of elements are arranged such that the elements are mirror images of each other. For example, the elements 501 of the example embodiment of FIG. 5 are opposite each other in a mirror-image configuration. These mirrored pairs of elements 501 can be intersecting and overlapping themselves or other pairs. The pairs may be arranged such that there is no unpatterned area on the light redirecting film.

The illustrative optical elements of the present example embodiments have a cross section indicating an approximately 90 degree included angle at the highest point of the element. This cross-section is beneficial because an approximately 90 degree ridge angle produces the highest on-axis brightness for the light redirecting film. More generally, the cross-sectional included angle at the highest point of the element (e.g., the ridge 104) may be in the range of approximately 88° to approximately 92° with little to no loss in on-axis brightness. When the angle of the ridge is less than approximately 85 degrees or more than approximately 95 degrees, the on-axis brightness for the light redirecting film decreases.

Each optical element 101 efficiently redirects light that exits the film through its side surfaces 102, 103. However, light diffractive effects and manufacturing imperfections at the ridge 104 may cause light exiting the film at the ridge to scatter. In addition, any light exiting the film in an unpatterned area will also fail to be redirected. To improve the light redirection provided by the films of the example embodiments, the percentage of the film composed of ridges and unpatterned area are beneficially minimized.

Figure 7:
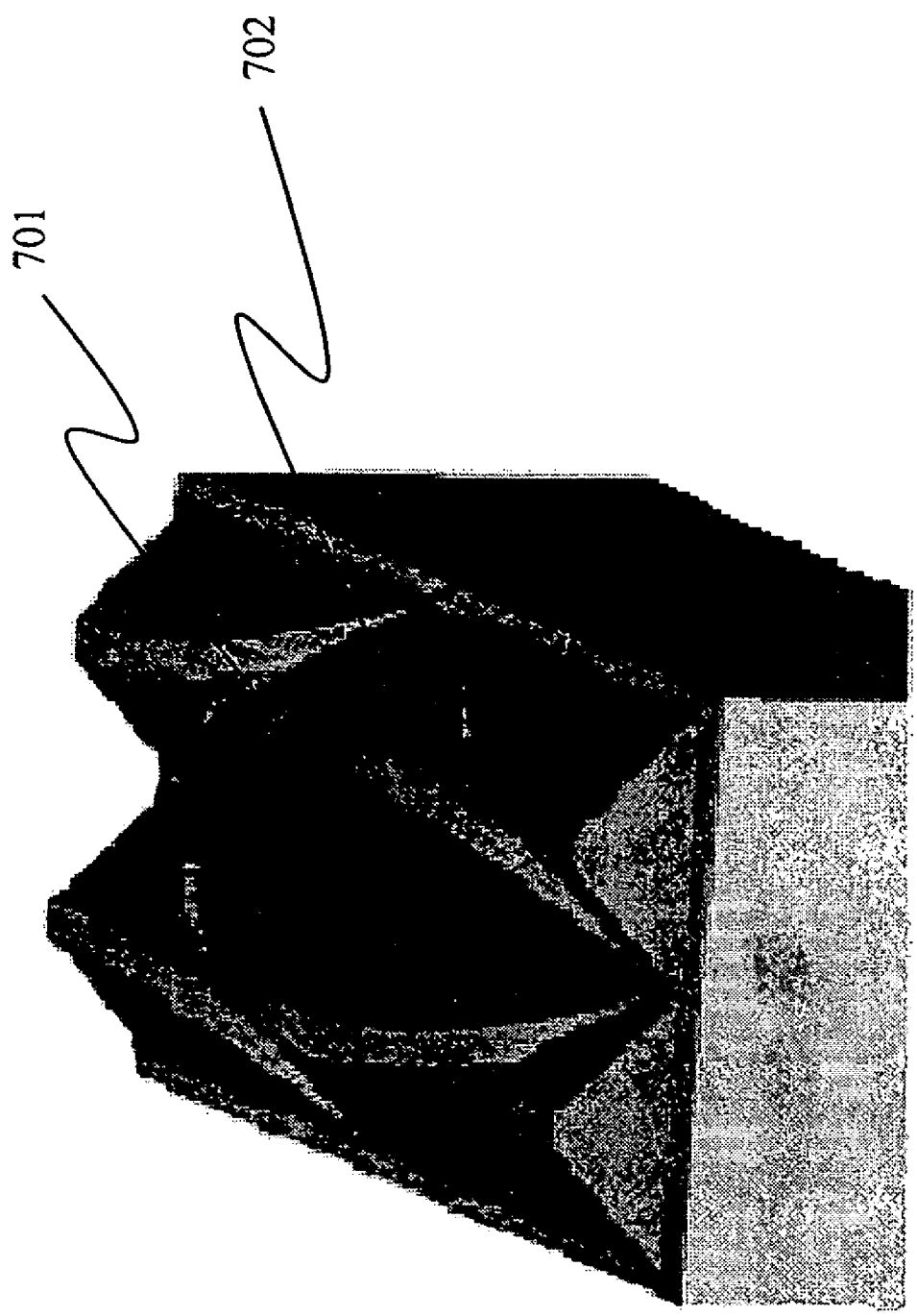
FIG. 7 is a view of a section of a light redirecting film in accordance with an example embodiment.

FIG. 7 shows a portion of a light redirecting film having an element 45 with a land 701.

Figure 8:
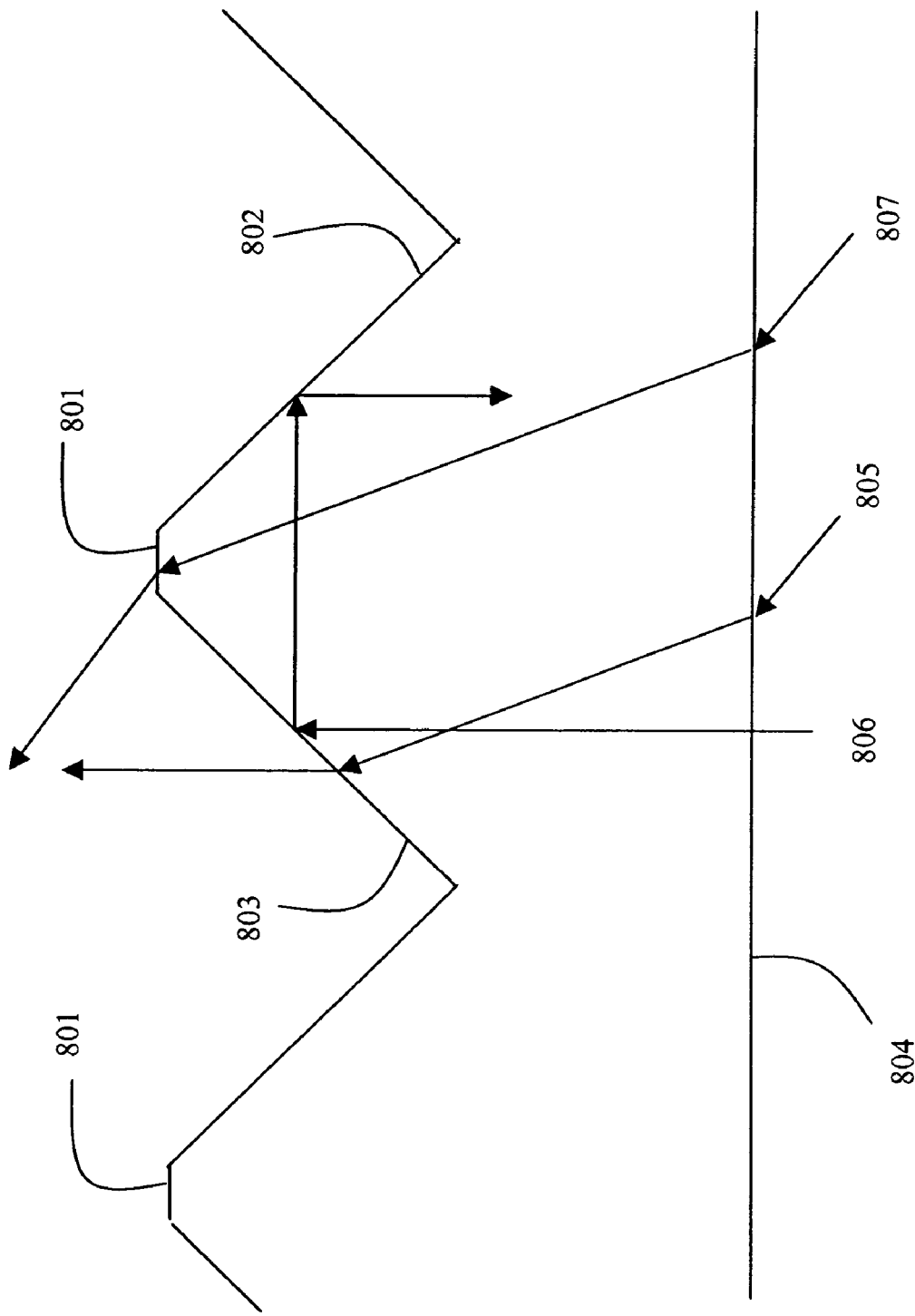
FIG. 8 is a schematic cross-section of a light redirecting film in accordance with an example embodiment.

FIG. 8 shows a schematic cross-section of a light redirecting film and an individual optical element. Off-axis light 805 (i.e., off the normal surface 804) enters the film from the back surface 804 of the film. If the off-axis light strikes the side 802 or 803 of an optical element at a low angle of incidence, it is refracted and emerges with an orientation that is more closely parallel to the normal to the film. Light rays 806 that are incident on the side 802 or 803 of an optical element at a relatively high angle of incidence are reflected and recycled back through the lighting system.

Due to manufacturing imperfections, a land 801 is often created at the ridge of the element. Depending on the type of manufacturing imperfection that causes the land, the land may be flat or rounded or have other shapes that diverge from the shape of the two sides 802 and 803. Light rays 807 that are incident on the land 801 are refracted at an increased angle relative to the normal to the film and away from the viewer. If the width of the land 801 is below approximately the wavelength of the light, or the two sides 802 and 803 intersect at a single apex point, then diffractive effects still cause the light rays 807 incident on the element near the ridge to scatter in undesired directions.

The manufacturing imperfections that can create a land on the optical element ridge may come from many sources. For example, it is difficult to precision pattern an entire mold or pattern roller with a land less than approximately 0.5 micrometers wide across the entire roller because the tip of the tool cutting the optical elements into the mold or roller wears and chips causing the land on the tool to grow and therefore the land of the cut optical elements grow. Moreover, very high molding pressures and temperatures, or very low material viscosities, may be required to accurately reproduce a mold land of less than approximately 1.0 micrometers, making lands of such small dimensions impractical to mold.

The width of the land 801 impacts the on-axis gain of the film. A wider land will cause a greater portion of the input light to be directed away from the viewer or scattered. The light lost due to its being incident on lands 801 is proportional to the ratio L/p, where L is the average width of the ridge land 801 of optical elements, and p is the average pitch between ridges of optical elements. The ratio L/p is called the "land ratio" of the film. The greater the portion of the overall film surface consists of land 801, the lower will be the on-axis gain of the film. Contrastingly, the smaller the land ratio, the comparatively greater the on-axis gain. As a result, the width of the land 801 is ideally a point formed by the convergence of the two sides 802 and 803. Thus, it is beneficial to minimize the width of the land 801 as much as possible. In addition, it is beneficial to maximize the average pitch of the optical elements.

In addition to the considerations mentioned, because of the light scattering at the land 801, when the film is illuminated from behind (e.g., light incident on the rear surface 804 from a light source) and viewed from an angle other than the normal, the lands 801 of the optical elements appear brighter than the sides of the elements 802, 803. The repeating pattern of optical elements on the film, combined with other repeating structures that the light passes through such as LCD arrays, can cause moiré interference patterns to be visible when viewed off-axis.

In accordance with an example embodiment, to reduce moiré interference and other undesired optical effects, the positions of the optical elements are randomized. A randomizing process in accordance with an example embodiment is described presently. It is emphasized that this process is merely illustrative and that other processes may be carried out to realize the randomized patterns of example embodiments.

Starting from its position in an initial substantially ordered (i.e., substantially non-random) pattern, each element may be displaced left or right by up to a chosen maximum horizontal displacement distance d. (It is noted that the initial substantially ordered pattern may also be referred to as a reference pattern.) A signed displacement in the X direction is randomly chosen independently for each element in the range from −d to +d. Larger random displacements will result in greater reduction of moiré interference effects. Negative displacements are to the left, and positive displacements are to the right. Some elements may be left in their original position, corresponding to a displacement of zero distance.

The random displacements may be chosen to be uniformly distributed in the range −d to +d, or they may have other distributions such as normal, triangular, or other distributions. The range −d to +d may also be divided into any number of discrete values from which the displacements are chosen randomly. For example, the displacements may be randomly chosen to be one of the two values −d or +d, or they may be randomly chosen to be one of the three values −d, 0, or +d. Those skilled in the art will appreciate that if the maximum negative displacement is not equal to the maximum positive displacement, the result is simply an equivalent randomized pattern shifted horizontally.

In certain illustrative embodiments, each element can also be randomly displaced vertically in a similar way. The maximum vertical displacement distance can be the same as or different from the horizontal maximum displacement distance. Negative vertical displacements displace the element down, positive displacements displace the element up, and zero displacements leave the element in its initial vertical position.

Figure 9:
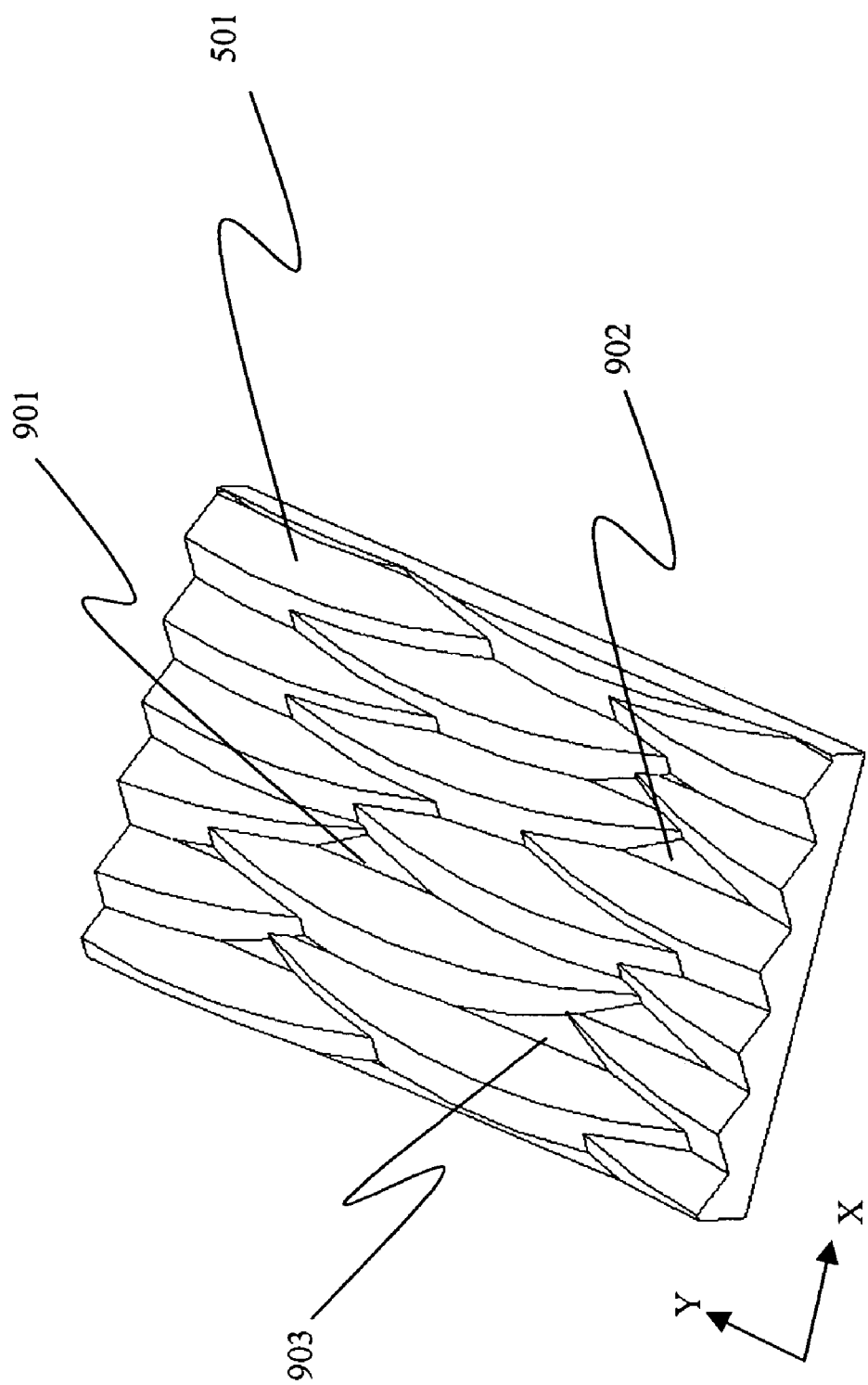
FIG. 9 is a schematic drawing of an optical film in which each optical element has been displaced randomly in accordance with an example embodiment.

For example, FIG. 9 is a schematic drawing of an optical film of an illustrative embodiment in which each optical element 501 has been displaced randomly from its nominal position in the Y direction by up to 20% of the Y pitch, and in the X direction by up to approximately 20% of the X pitch. Where neighboring optical elements have moved in opposite directions, unpatterned area 901, 902, 903 have been left on the film. The unpatterned area 901, 902, 903 will refract incident light away from the film normal, resulting in lower on-axis gain. As such, it is useful to minimize the unpatterned areas of the film.

Figure 10:
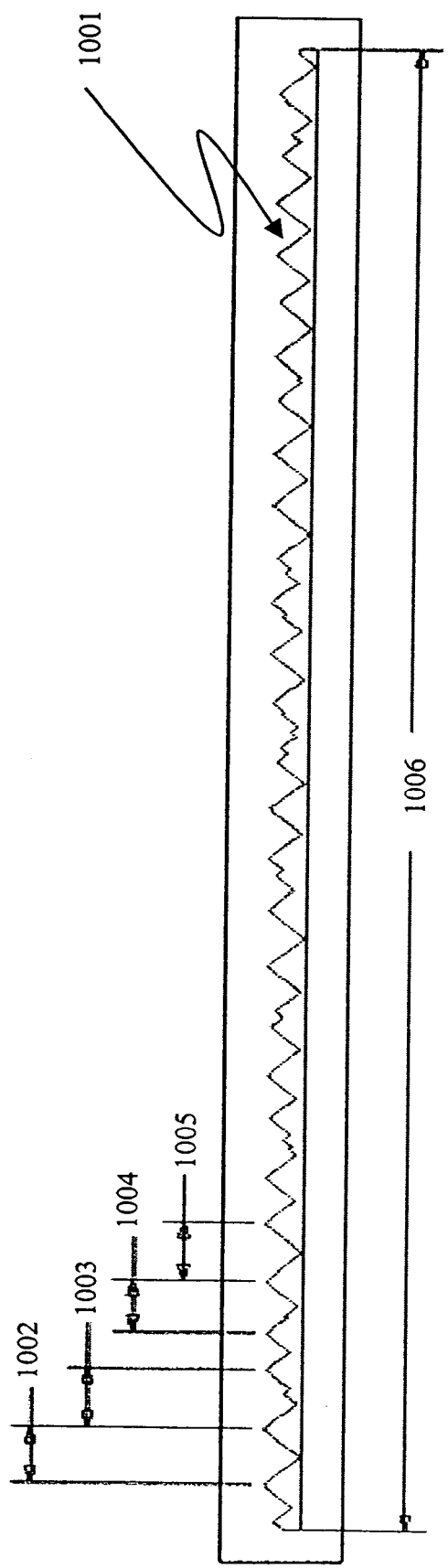
FIG. 10 is a schematic of a cross-section of a light management film in accordance with an example embodiment.

FIG. 10 is a schematic of a cross-section of the light management film 1001 of an example embodiment. The pitch from the ridge of each of the elements to the ridge of its neighboring element varies across the film. For example, pitches 1002, 1003, 1004, 1005 are of different lengths. The average pitch of the elements is calculated by taking the length 1006 of the cross-section of the film and dividing it by the number of ridges that occur in that length.

To reduce the occurrence of unpatterned areas when randomizing the optical element positions, the nominal pitch of the optical elements can be reduced in each direction by two times the maximum random displacement in that direction. Elements that touch or overlap on any side are referred to as "neighbors" or "neighboring elements." Reducing the pitch in a direction will cause neighboring elements to overlap in that direction. For example, FIG. 11a shows two optical elements 1101, 1102 from a light-redirecting film that are just touching horizontally. In keeping with an example embodiment, in order to reduce moiré effects, element 1101 might be displaced horizontally by a signed distance x1, and element 1102 might be displaced horizontally (x-direction) by a signed distance x2. If the difference x2−x1 is positive, then unpatterned area will be left between the two optical elements 1101, 1102. In contrast, as shown in FIG. 11b, the two optical elements 1103, 1104 have been overlapped in their nominal position by a distance 1105. If optical element 1103 is displaced horizontally by a signed distance x3, and optical element 1104 is displaced horizontally by a signed distance x4, then unpatterned area will only be left between the two optical elements 1103, 1104 if the difference x4−x3 is greater than the overlap 1105. Further, if each horizontal displacement x3 and x4 is limited in unsigned magnitude to less than half of the overlap 1105, then the horizontal displacements can be chosen independently and no unpatterned area will result from these displacements. It is noted that vertical displacement by a similar method may be effected to reduce moiré and unpatterned area on the film.

Figures 12A, 12B, 12C, 12D:
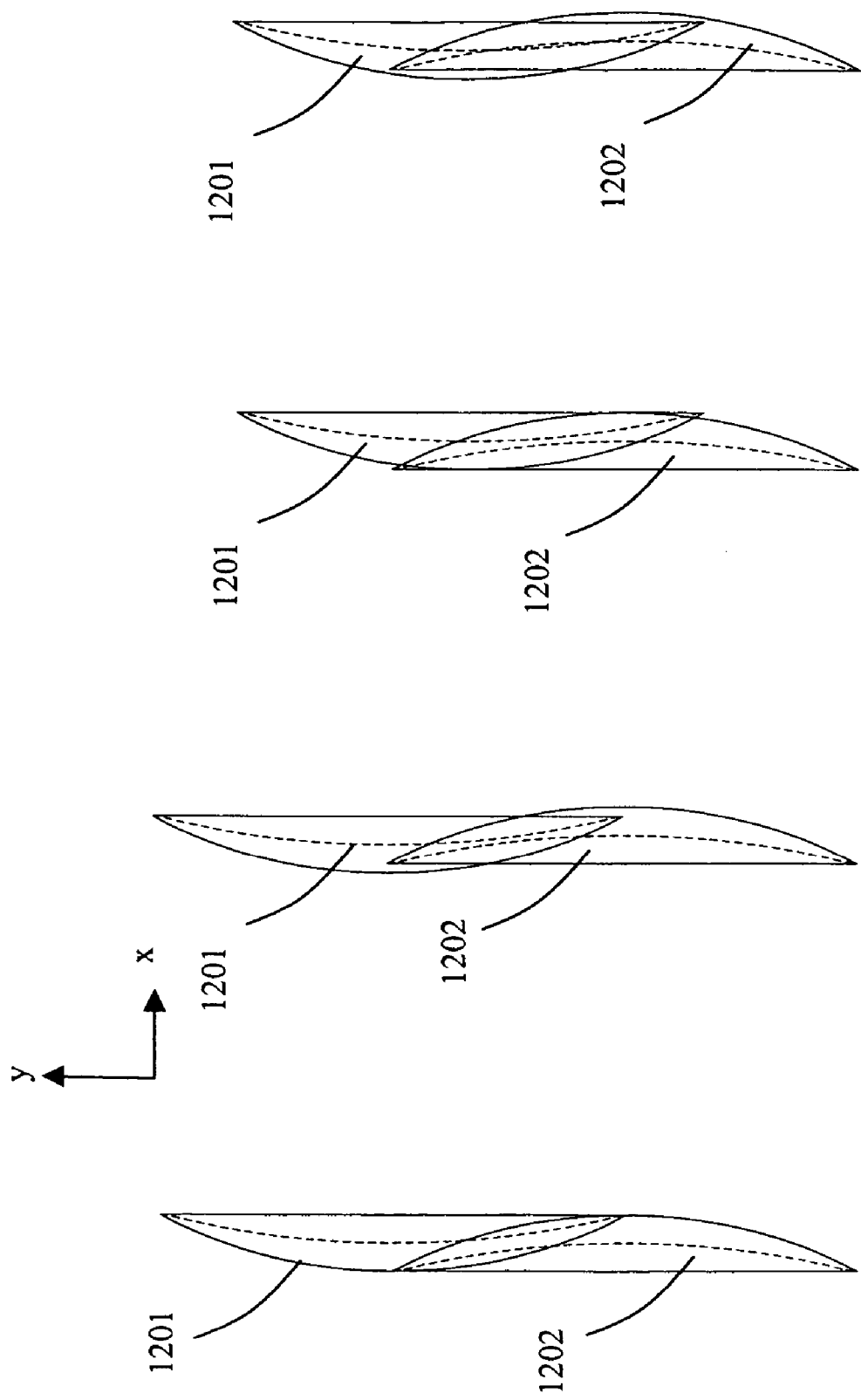
FIGS. 12a, 12b, 12c, and 12d illustrate optical elements that are neighbors in both horizontal and vertical directions in accordance with example embodiments.

FIGS. 12a–12d are schematic drawings of optical elements of a light redirecting film of an example embodiment. Optical elements 1201 and 1202 are neighbors in both horizontal and vertical directions. FIG. 12a shows two optical elements 1201 and 1202, with element 1202 rotated approximately 180 degrees from element 1201 and placed in a relative position that can be repeated to efficiently cover an optical film, as for example in FIG. 5. In their position in FIG. 12a, the two optical elements 1201, 1202 barely overlap, and any displacement away from each other in either horizontal (x direction) or vertical (y direction) directions will cause some unpatterned area to open up between them.

In FIG. 12b, the two optical elements have been overlapped by a small amount horizontally, to allow for horizontal displacement from their nominal positions without creating unpatterned area. In FIG. 12c, the two optical elements 1201, 1202 have been overlapped by a small amount vertically, to allow for vertical displacement without creating unpatterned area. In FIG. 12d, the two optical elements have been overlapped in both horizontal and vertical directions, thus allowing displacement in both directions without creating unpatterned area.

In accordance with certain illustrative embodiments, the initial overlapped pattern of elements can be designed by first creating a pattern that completely covers the surface but which has substantially no overlapping or minimal overlapping between the optical elements. The initial pattern might be ordered (nonrandom) or may have elements of randomness itself. Then the elements are overlapped in each direction of desired random displacement, reducing the pitch of the elements in each such direction by the amount of the overlap in that direction, to produce the initial overlapped pattern.

From this initial overlapped pattern, each element may be randomly displaced while maintaining complete surface coverage. For example, the outline of the elements might be rectangular, with the elements initially arranged in a grid with pitch in each direction equal to the length of the rectangle in each direction, so that the elements are just touching in each direction. By overlapping the rectangular elements by an overlap distance horizontally and/or vertically, random displacements may be applied to each rectangular element in the respective directions while maintaining complete surface coverage.

For a more complex example, the wedge-shaped optical elements 401 of FIG. 4 could be arranged to completely cover the surface in varying ways, one of which is shown in FIG. 4. By reducing the pitch of the wedge-shaped elements by an overlap distance horizontally and/or vertically, random displacements may be applied to each wedge-shaped element in the respective directions while maintaining complete surface coverage.

Those skilled in the art having had the benefit of the present disclosure will recognize that in some arrangements of optical elements (e.g., the diamond-shaped optical elements 403 in FIG. 4), the displacements and overlaps may be in directions that are not horizontal and vertical, and the displacements and overlaps may be made in two or more directions that are not perpendicular. In addition, in some cases a single overlap can suffice to allow for displacements in more than one direction without creating unpatterned area; the combined overlap in FIG. 12d can be considered an example of this case. In further example embodiments, the overlap might be made in a direction that is not parallel to the displacement that it allows; the combined overlap in FIG. 12d can be considered an example of this case as well.

Figure 13:
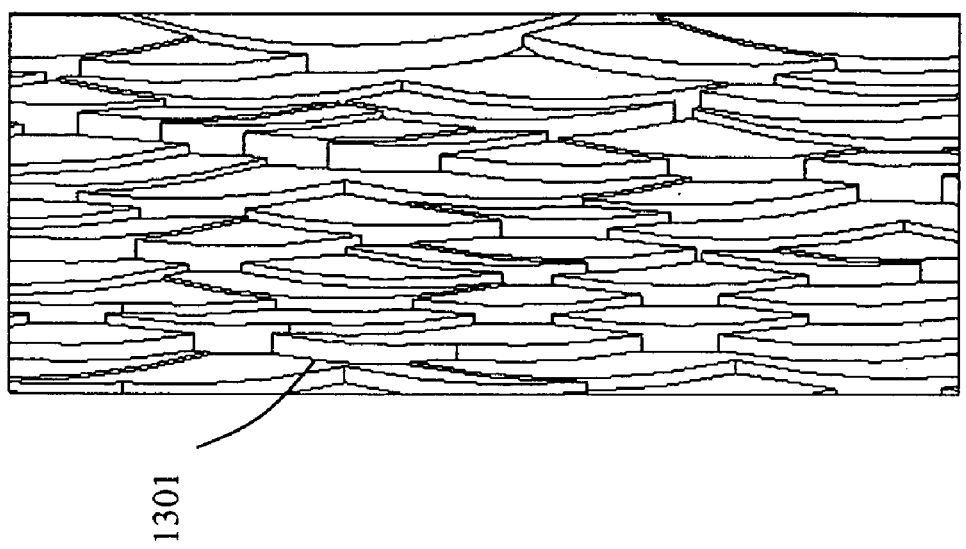
FIG. 13 is a schematic drawing of an optical film with overlapping optical elements in accordance with an example embodiment.

FIG. 13 is a schematic drawing of an optical film from a top-view that is created using the method of an illustrative embodiment. In this example embodiment the optical elements described in connection with FIG. 9 are overlapped by approximately 40% of the pitch in each direction (horizontally as well as vertically), then randomly displaced by up to approximately 20% of the pitch in each direction. In the resulting pattern, the plurality of optical elements 1301 are overlapped enough that if neighboring elements are randomly displaced away from each other, the surface of the film remains substantially completely covered and no unpatterned area is exposed. It is noted that relatively large random displacements may reduce moiré interference, but may require more optical element overlap, increasing the land ratio L/p and hence possibly reducing on-axis gain.

On-axis gain may be increased by providing optical elements that are larger or wider (i.e., along the x-axis). Increased dimensions can increase the average pitch of the film, which can decrease the land ratio (L/p) and thereby increase the on-axis gain of the film. To maintain an approximately 90-degree apex angle, the height of the optical elements is typically increased as well. However, the larger optical elements might become visible to a viewer of the film or display. Furthermore, manufacturing requirements impose limits on the size of the optical elements in the pattern roller or mold, and may make the larger elements more difficult to replicate in the film. Within these design and manufacturing constraints, the methods of the example embodiments may be applied to minimize moiré and maximize on-axis gain of optical films made of elements of any size.

In certain example embodiments described herein, the light redirecting film has a substrate with a length and a width. For purposes of illustration, these films may be used in display devices such as cellular phone displays, televisions, computer monitors, or lighting applications where the length of the substrate is in the range of approximately 30 times to approximately 1000 times the length of an element in the elements 'long' direction. Moreover, the optical elements of the light redirecting layers of the example embodiments are much longer than they are wide. In such embodiments, the width of the substrate is on the order of approximately 600 times to approximately 20,000 times the width of an element.

In keeping with the considerations of element size, example embodiments substantially maximize random displacement of each optical element while substantially minimizing the size and overlap of the elements required avoiding unpatterned area. This may be accomplished by a pattern in which each element is randomly displaced from its position in an initial nominal grid, wherein the random displacements are subject to the constraint that the signed difference in displacement between any two neighboring elements cannot be greater than the nominal overlap between those elements. This approach allows the overall random displacements to be quite large, while avoiding unpatterned area with only a small amount of overlap between neighboring elements. In some embodiments, the random displacement of some optical elements is significantly larger than the initial overlap between neighboring elements. Yet because the signed difference in the displacement of neighboring elements is constrained to be no greater than the overlap, the average pitch can remain relatively large and unpatterned area is substantially avoided, which keeps on-axis gain high.

The random displacement of each optical element can be chosen continuously, or it can be chosen as an integer multiple of a given distance. For example, in certain illustrative embodiments, the random displacement of each optical element in the light redirecting film is an integer multiple of the overlap distance in each direction. These embodiments allow a small overlap to maximize on-axis gain, together with large displacements to reduce moiré interference. Depending on the application, in embodiments, continuously-chosen random displacements may reduce moiré interference by substantially avoiding the multiples of a given distance.

In illustrative embodiments, the overlap between neighboring optical elements is between approximately 3% and approximately 10% of the optical element width horizontally, and between approximately 3% and approximately 10% of the optical element height vertically. The small amount of overlap keeps the average pitch p close to its nonoverlapped value, and as a result the land ratio L/p is very close to its nonoverlapped value, and on-axis gain remains high. The random displacements (d) are chosen in a range from −d to +d, where d has a value of approximately 3% to approximately 50% of the optical element length in each direction. In other example embodiments the overlap distance is approximately 1% to approximately 20% of the length of the elements measured in the direction of the overlap distance. Random displacements of approximately 50% in each direction are called "full-phase randomization," and they result in patterns that are almost completely random, which in turn almost completely removes the opportunity for moiré when the optical film is used in a system with other structures. When other manufacturing or design issues limit the scale of the random displacements, then random displacements that are smaller than approximately 50% can result in lesser but still significant reductions in moiré interference effects.

Although the patterns of embodiments of the present invention are described with respect to an initial nominal grid and displacements from that grid, it will be appreciated by those practiced in the art, who have had the benefit of the present disclosure that the optical elements may be placed in the pattern in a variety of ways with similar results. For example, in embodiments the elements might be initially placed in a grid, and then random displacements applied to optical elements repeatedly in random order, where each displacement is randomly chosen to obey the constraint that neighboring elements must still overlap with respect to its neighbors current positions. In other embodiments, the elements might be initially placed in a grid, and then random displacements applied to optical elements repeatedly in random order, each time adjusting the positions of neighbors to maintain the required overlap constraint. If a neighbor must be moved to maintain the overlap constraint, then its neighbors may also need to be moved as well, and so on. In embodiments, the optical elements might be randomly placed on the optical film pattern without regard to the overlap constraint, and once all of the elements are placed then their placements would be adjusted to ensure that no neighboring pair of elements leaves unpatterned area.

When multiple copies of the pattern of optical elements must be placed next to each other in a device or application, then it is critical that the edges of the pattern not be visible. For example, if the light redirecting film is to be manufactured using a patterned roller, then the pattern of optical elements must wrap around the roller. In example embodiments, the optical elements wrap around the roller without a visible seam where it meets itself. For another example, a patch of the optical element pattern may be desired to repeat in the axial direction of the roller to reduce the computational burden of generating and representing the entire patterned roller surface.

To allow multiple copies of the pattern to be placed next to each other with no visible seam, the constraint that neighboring elements must not significantly displace away from each other by more than the amount of overlap is interpreted such that "neighbors" can wrap around from the top of the pattern to the bottom, and from the left side to the right side of the pattern. For example, the top-most optical element in a pattern would be considered a vertical neighbor of the bottom-most optical element in the same horizontal position. Similarly, the left-most optical element in the pattern would be considered a horizontal neighbor of the right-most optical element in the pattern with the same vertical position. The optical elements in corners of a pattern will, in some cases, have neighboring optical elements in the other corners of a pattern, depending on the shape of the overall pattern and the desired method of tiling the film with copies of the pattern. The pattern may be rectangular, triangular, or have other shapes designed to tile the film depending on the application chosen. Other optical element neighbors that have a more complex overlapping relationship, for example the neighboring optical elements of FIGS. 12a–12d, can have neighbors that wrap around the pattern edges in a more complex way that will nonetheless be known to those skilled in the art.

In example embodiments, neighbors may wrap around the edges of the pattern and the displacements of the optical elements can be again chosen randomly, subject to the constraint that neighboring optical elements, including neighboring elements that wrap around the pattern edges, do not significantly displace away from each other by more than the overlap distance. In this way, multiple copies of the pattern can be placed next to each other without any detectable seam.

Figure 14:
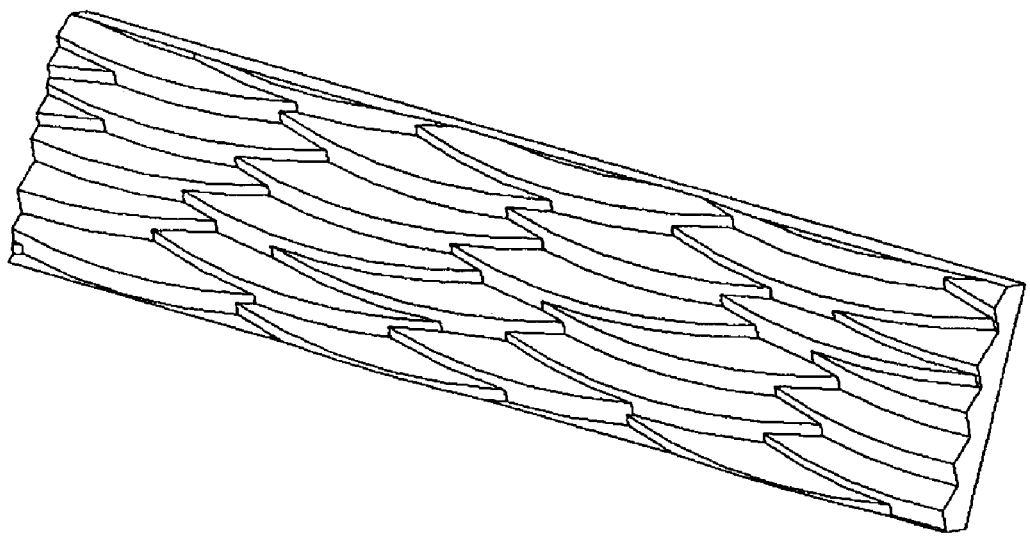
FIG. 14 is a schematic diagram of an optical film with random displacements whose magnitude is larger than the initial overlap of the elements in accordance with an example embodiment.

FIG. 14 shows a schematic diagram of a section of an optical film according to embodiments of the invention, with a small overlap but large random displacements. The shape of the individual optical elements are the same as those in FIG. 9, and the random displacements of the optical elements are of the same maximum size as those in FIG. 9. The optical elements in their nominal positions have an overlap of approximately 5% of their vertical length and approximately 6.7% of their horizontal width, resulting in an average pitch that is much larger than the average pitch of the film of FIG. 13 and an average pitch that is very close to that of the film of example FIG. 9. In FIG. 14 the optical elements are randomly displaced up to approximately 20% of their horizontal or vertical dimension, subject to the constraint that the signed difference in displacement between two neighboring elements may not be greater than their initial overlap. The film of FIG. 14 has relatively high average pitch and resulting high on-axis gain, but has large random displacements of the individual optical elements to produce large reductions in moiré patterns.

Figure 15:
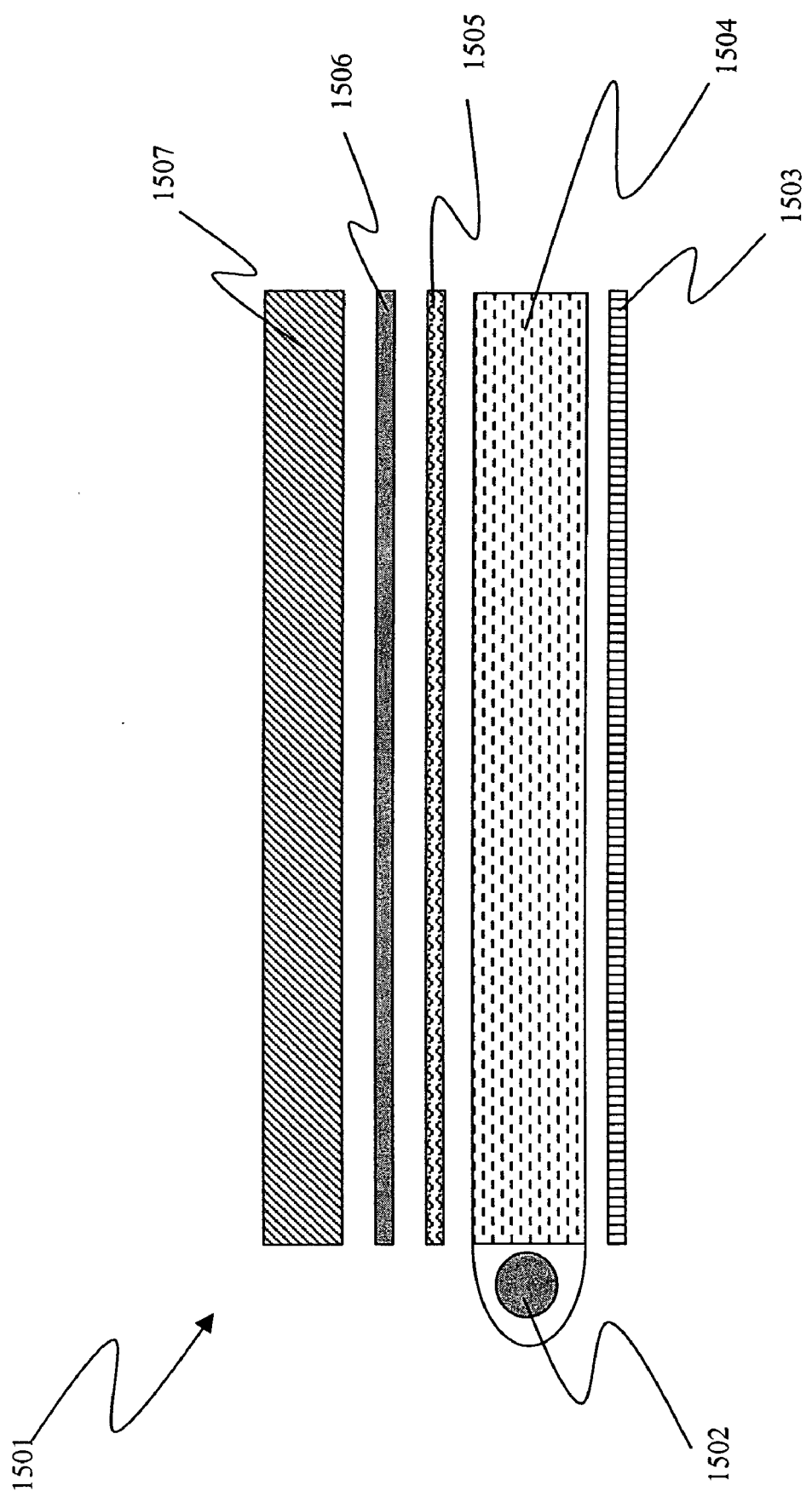
FIGS. 15, 16, 17, and 18 illustrate liquid crystal displays with light redirecting films in accordance with example embodiments.

FIG. 15 shows a display 1501 in which a light redirecting film 1506 is incorporated into a liquid crystal display in accordance with an example embodiment. Light is outputted by the light source 1502 into a light guide 1504. A light source 1502 is typically a cold fluorescent bulb or LEDs, but can be any source capable of producing light. The light guide 1504 may be tapered or a slab and has a back reflector 1503 on one side of the light guide 1504. The light exits the light guide through the side opposite to a back reflector 1503 and passes through a diffuser 1505. The diffuser 1505 serves to even the light output of the light guide 1504 across the display, hide any elements that are sometimes printed onto or embossed into the light guide, and reduce moiré interference effects. Next the light passes through a light redirecting film 1506 and the light output from the light redirecting film 1506 is in a narrower cone compared to the light entering the film. The light redirecting film 1506 may be oriented such that the individual optical elements face away from the light guide 1504. The light then enters a liquid crystal display module 1507. Between the light redirecting film and the liquid crystal section there can be other films such as a top diffuser or a reflective polarizer (not shown). The elements on the light redirecting film 1506 may have pitch or angular orientation that are varied relative to the dimensions, pitch or angular orientation of the pixels or other repeating elements such that moiré patterns are not visible through the LCD panel.

Figure 16:
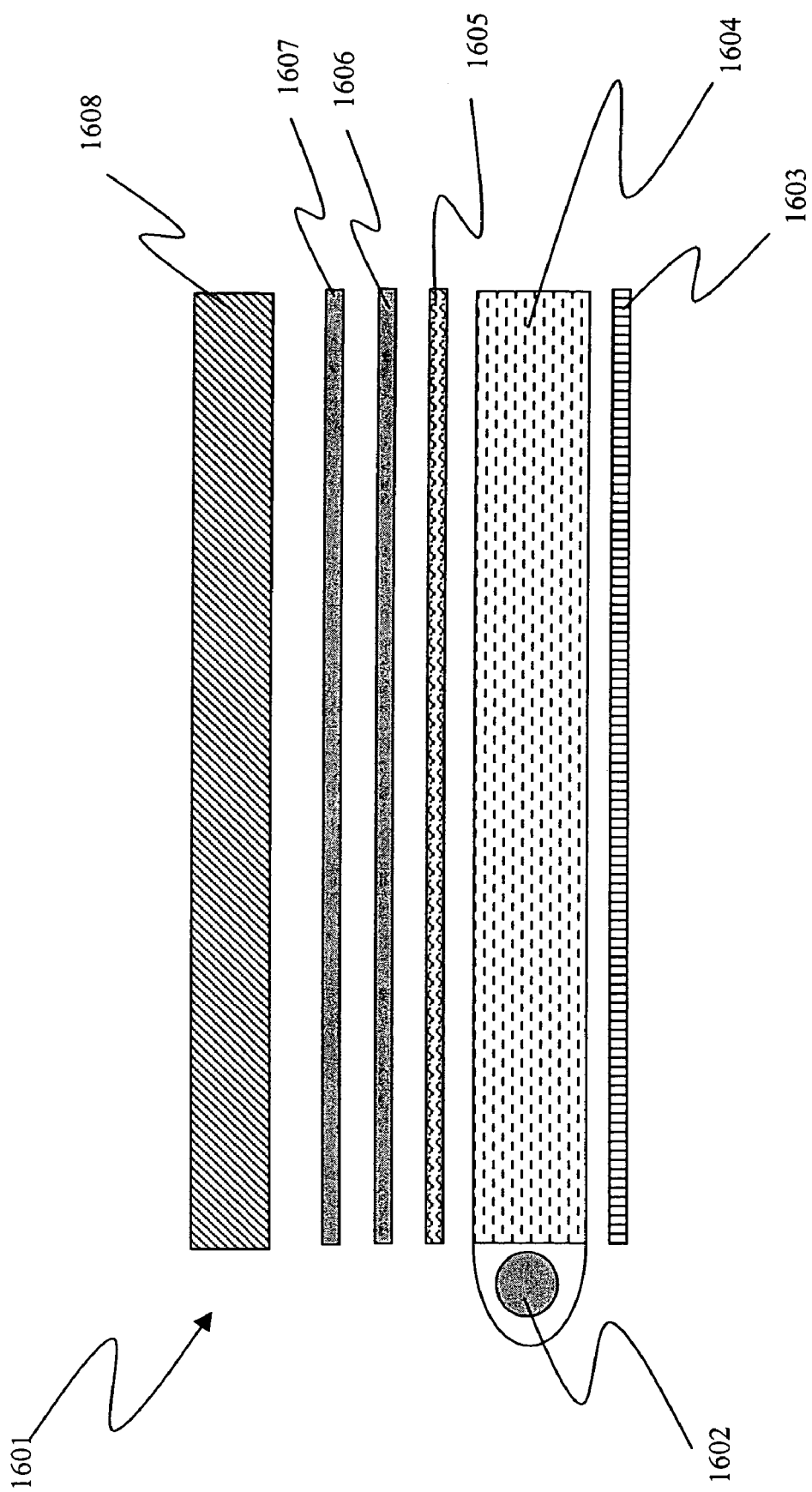

FIG. 16 shows a display 1601 where two light redirecting films 1606 and 1607 are incorporated into a liquid crystal display in accordance with an example embodiment. In the example embodiment light is output by the light source 1602 into a light guide 1604. The light source 1602 is typically a cold fluorescent bulb or LEDs, but can be another suitable light source useful in backlight display applications. The light guide 1604 may be tapered or a slab and has a back reflector 1603 on at least one side. The light exits the light guide 1604 through a top surface and passes through a diffuser 1605. The diffuser 1605 serves to even the light output of the light guide 1604 across the display, hide any elements that are sometimes printed onto or embossed into the light guide, and reduce moiré interference effects. Next the light passes through a light redirecting film 1606 and a light redirecting film 1607. The two light redirecting films are crossed at an angle of approximately 80 degrees to approximately 100 degrees relative to one another. Both light redirecting films 1606 and 1607 are oriented such that their individual optical elements face substantially away from the light guide 1604. The light then enters the liquid crystal display module 1608. Between the light redirecting film and the liquid crystal section there can be other films such as a top diffuser or a reflective polarizer. The elements on the light redirecting film 1606 and 1607 have pitch or angular orientation, or both, that are varied relative to the dimensions, pitch, or angular orientation, or a combination thereof of the pixels or other repeating elements such that moiré patterns are substantially not visible through the LCD panel.

As referenced previously, the light redirecting films of illustrative embodiments can also be used with a lighting system. Light is produced by the light source, which can be light bulb, organic or inorganic light emitting diode, solid-state light source, or any other apparatus suitable as a light source in lighting systems. The light exits the light source and enters the light redirecting film where is it redirected and recycled. This could be used for indoor lighting applications such as task lighting or spot lighting for pictures or any other lighting application that requires more redirected light than what the lighting source provides alone.

The light redirecting film can also be used in a display system. The display can be any form of display such as a liquid crystal display, organic light emitting diode OLED display, or digital micromirror device (DMD)-based displays. An organic light emitting diode display may be implemented so that for one-viewer situations, the light from the OLED can be redirected such that the one viewer has a brighter display on-axis. The display can be active or static. The light redirecting film serves to redirect the light from the display on axis.

Figure 17:
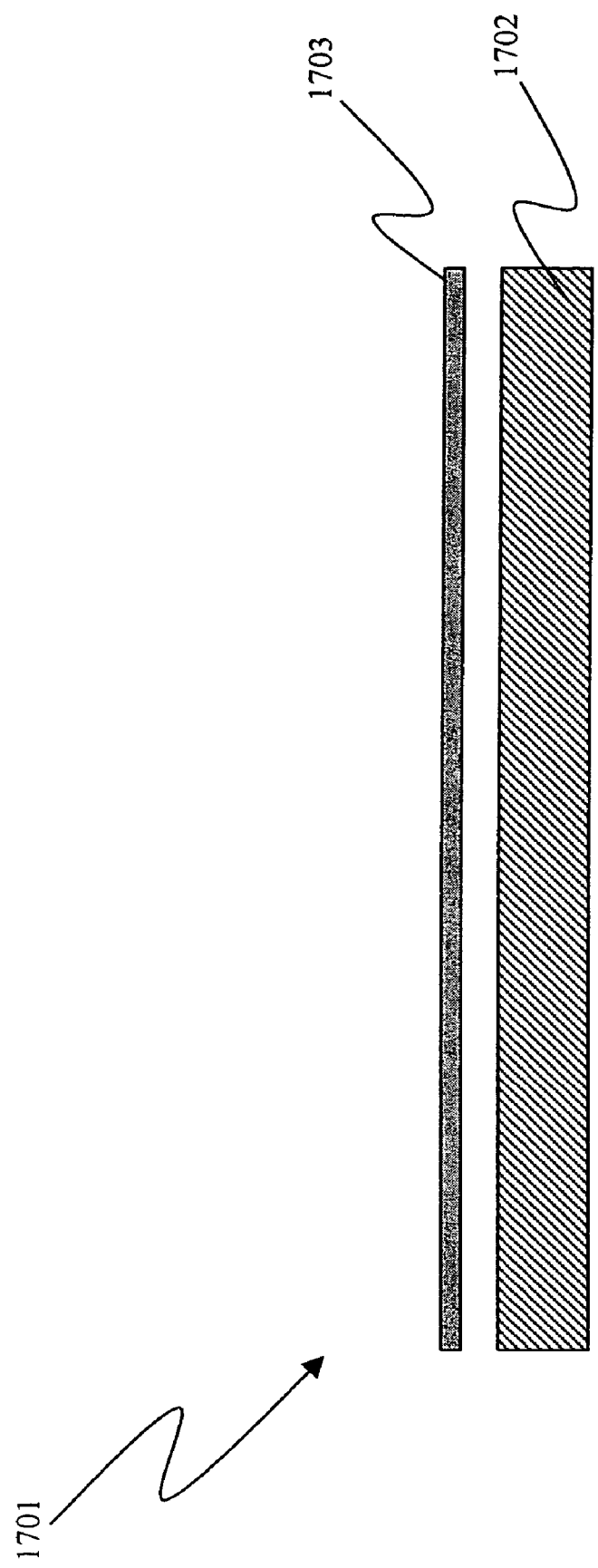

FIG. 17 shows a lighting system 1701 with a light redirecting film 1703. Light is produced by a light source 1702, which can be light bulb, organic or inorganic light emitting diode, solid state light source, or any other suitable light source for lighting systems. The light exits the light source 1702 and enters the light redirecting film 1703 where is it redirected. This system could be used for indoor lighting applications such as task lighting or spot lighting for pictures or any other lighting application that requires more redirected light than what the lighting source is outputting.

Figure 18:
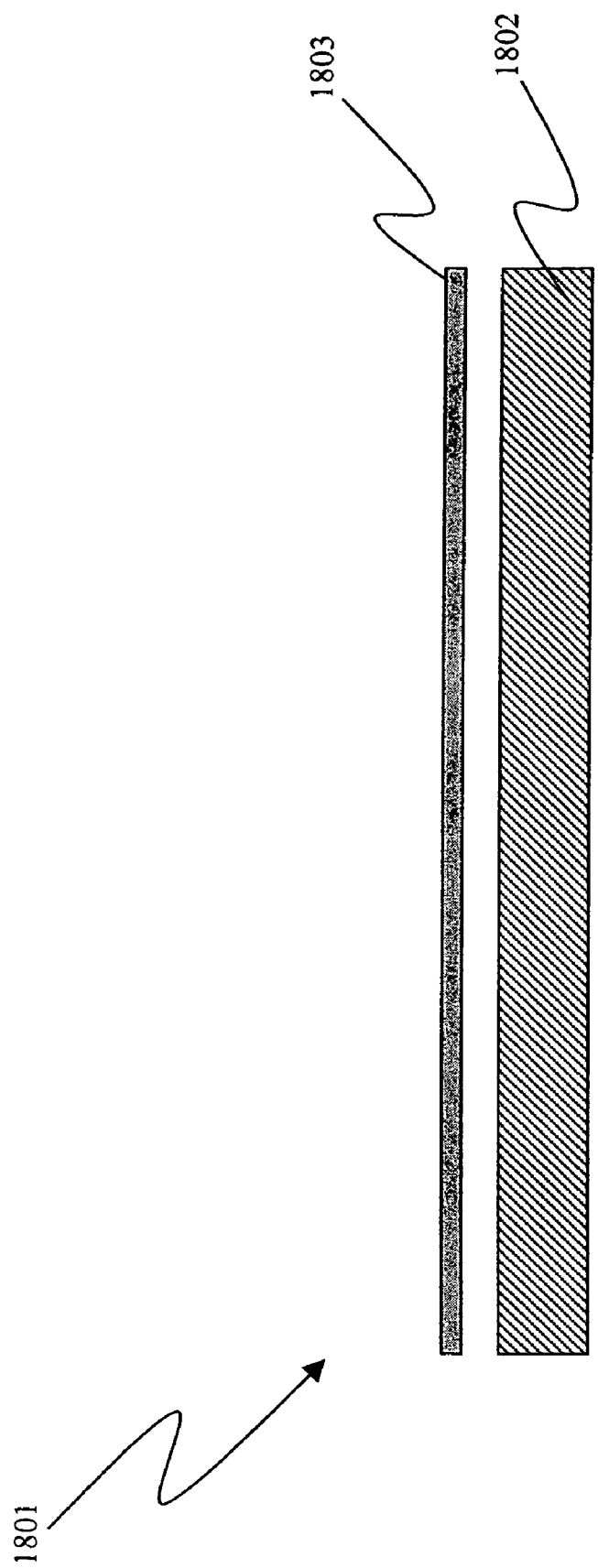

FIG. 18 shows a display system 1801 that includes an organic light emitting diode display (OLED) 1802 and a light redirecting film 1803. The light redirecting film may be used with an organic light emitting diode display so that for one-viewer situations, the light from the OLED can be redirected such that the one viewer has a brighter display on-axis. The display can be active or static. The light redirecting film serves to redirect the light from the display on axis.

Illustrative embodiments have numerous advantages compared to current light redirecting films. The placement of individual optical elements on the film balance the tradeoffs between moiré reduction and on-axis gain producing relatively high on-axis gain while significantly reducing moiré. Moiré patterns result when two or more regular sets of lines or points overlap. It results in a pattern of repeating lines, the line size and frequency depending on the two patterns interacting. In a display device such as a LCD display, moiré patterns that can be observed by the viewer of the LCD device are objectionable as they interfere with the quality of the displayed information. The light redirecting film of embodiments of the invention reduces moiré compared to prior art light redirecting films while maintaining the amount of on-axis gain.

What is claimed is:

1. A method of randomizing elements into a random pattern on a surface so the random pattern of elements substantially entirely consumes a region of the surface, the method comprising:
choosing an overlap distance;
creating an initial pattern of elements that substantially entirely consumes a region of the surface, wherein neighboring elements overlap by the overlap distance;
choosing a maximum displacement distance; and
displacing the elements by random displacement distances from their positions in the initial pattern, the random displacement distances being less than the maximum displacement distance, wherein a signed difference in displacement between two neighboring elements is not greater than the overlap distance.

2. The method of claim 1, wherein the elements are three-dimensional elements.

3. The method of claim 2, wherein the elements are optical elements.

4. The method of claim 3, wherein the random pattern of elements corresponds to a pattern of optical elements of a light redirecting film.

5. The method of claim 1, comprising patterning a surface of a molding substrate with the random pattern of elements.

6. The method of claim 5, wherein the molding substrate is a molding cylinder.

7. The method of claim 1, wherein the initial pattern of elements is an ordered pattern of elements.

8. The method of claim 1, wherein the random displacement distances are integer multiples of a basic displacement distance.

9. The method of claim 8, wherein the integer multiple is randomly chosen from the group consisting of −1, 0, and 1.

10. The method of claim 1, wherein the neighboring elements overlap in two nonparallel directions and the overlap distance in one direction is different from the overlap distance in the other direction.

11. The method of claim 1, wherein the elements of the pattern have multiple sizes and/or shapes.

12. The method of claim 1, wherein the random displacements are in the same direction as the overlap.

13. The method of claim 12, wherein the random displacements are signed displacements chosen between the negative of the maximum displacement distance and the maximum displacement distance.

14. The method of claim 1, wherein the displacing is in at least one direction.

15. The method of claim 14, wherein the displacing is carried out in two nonparallel directions.

16. The method of claim 15, wherein the two nonparallel directions are substantially perpendicular.

17. The method of claim 15, wherein the maximum displacement distances are different in the two directions.

18. The method of claim 1, wherein the overlap distance is between approximately 1 percent and approximately 20 percent of the length of each of the elements measured in the direction of the overlap distance.

19. The method of claim 1, wherein the elements comprise a flat surface and a curved surface.

20. The method of claim 1, wherein the surface has a length and a width and the length of the surface is approximately 30 times to approximately 1000 times the length of an element.

21. The method of claim 1, wherein the surface has a length and a width and the width of the surface is approximately 600 times to approximately 20,000 times the width of an element.

22. The method of claim 1, wherein the maximum displacement distance is no greater than approximately half of the overlap distance.

23. The method of claim 1, wherein the maximum displacement distance is greater than approximately half of the overlap distance.

24. The method of claim 23, wherein the random displacement distances are integer multiples of the overlap distance.

25. The method of claim 23, wherein:
the random pattern is placed adjacent to an identical random pattern; and
the contacting areas of the random pattern and the identical random pattern are substantially invisible.

26. An apparatus, comprising:
a plurality of elements disposed in a substantially random pattern over a surface, the elements covering substantially all of a region of the surface and being disposed at random displacement distances from respective positions in a reference pattern of elements in which neighboring elements overlap by an overlap distance, the displacement distances being less than a maximum displacement distance, and the signed difference in displacement between two of the neighboring elements is not greater than the overlap distance.

27. The apparatus of claim 26, wherein the elements are three-dimensional elements.

28. The apparatus of claim 27, wherein the three-dimensional elements are optical elements.

29. The apparatus of claim 28, wherein the random pattern of elements corresponds to a pattern of optical elements of a light redirecting film.

30. The apparatus of claim 26, wherein the surface is the surface of a molding substrate.

31. The apparatus of claim 30, wherein the molding substrate is a molding cylinder.

32. The apparatus of claim 26, wherein the reference pattern of elements is an ordered pattern of elements.

33. The apparatus of claim 26, wherein the random displacement distances are integer multiples of a basic displacement distance.

34. The apparatus of claim 33, wherein the integer multiple is randomly chosen from the group consisting of −1, 0, and 1.

35. The apparatus of claim 26, wherein the neighboring elements overlap in two nonparallel directions and the overlap distance in one direction is different from the overlap distance in the other direction.

36. The apparatus of claim 26, wherein the elements of the pattern have multiple sizes and/or shapes.

37. The apparatus of claim 26, wherein the random displacements are in the same direction as the overlap.

38. The apparatus of claim 37, wherein the random displacements are signed displacements in the range from the negative of the maximum displacement distance to the maximum displacement distance.

39. The apparatus of claim 26, wherein the displacements are in at least one direction.

40. The apparatus of claim 39, wherein the displacements are in two nonparallel directions.

41. The apparatus of claim 40, wherein the two nonparallel directions are substantially perpendicular.

42. The apparatus of claim 40, wherein the maximum displacement distances are different in the two directions.

43. The apparatus of claim 26, wherein the overlap distance is between approximately 1 percent and approximately 20 percent of the length of each of the elements measured in the direction of the overlap distance.

44. The apparatus of claim 26, wherein the elements comprise a flat surface and a curved surface.

45. The apparatus of claim 26, wherein the surface has a length and a width and the length of the surface is approximately 30 times to approximately 1000 times the length of an element.

46. The apparatus of claim 26, wherein the surface has a length and a width and the width of the surface is approximately 600 times to approximately 20,000 times the width of an element.

47. The apparatus of claim 26, wherein the maximum displacement distance is no greater than approximately half of the overlap distance.

48. The apparatus of claim 26, wherein the maximum displacement distance is greater than approximately half of the overlap distance.

49. The apparatus of claim 48, wherein the random displacement distances are integer multiples of the overlap distance.

50. The apparatus of claim 48, wherein:
the random pattern is placed adjacent to an identical random pattern; and
the contacting areas of the random pattern and the identical random pattern are substantially invisible.

* * * * *